(12) United States Patent
Ishikura et al.

(10) Patent No.: US 7,724,921 B2
(45) Date of Patent: May 25, 2010

(54) VEHICLE-ONBOARD DRIVING LANE RECOGNIZING APPARATUS

(75) Inventors: Hisashi Ishikura, Tokyo (JP); Yoshiyuki Fujii, Tokyo (JP); Takayuki Yamamoto, Tokyo (JP); Hideki Tsukaoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/055,132

(22) Filed: Mar. 25, 2008

(65) Prior Publication Data

US 2010/0098296 A9  Apr. 22, 2010

Related U.S. Application Data

(62) Division of application No. 11/683,247, filed on Mar. 7, 2007, now abandoned, which is a division of application No. 10/379,531, filed on Mar. 6, 2003, now abandoned.

(30) Foreign Application Priority Data

Sep. 27, 2002 (JP) .............................. 2002-283589

(51) Int. Cl.
*G06K 9/00* (2006.01)
(52) U.S. Cl. .................................... 382/104
(58) Field of Classification Search ................ 382/104, 382/173, 282, 307
See application file for complete search history.

(56) References Cited

U.S. PATENT DOCUMENTS

| | | | |
|---|---|---|---|
| 5,926,164 A | 7/1999 | Terakawa et al. | 345/112 |
| 6,108,765 A | 8/2000 | Caudel et al. | 712/32 |
| 6,704,434 B1 | 3/2004 | Sakoh et al. | 382/104 |
| 6,829,388 B1 | 12/2004 | Sakurai | 382/199 |
| 6,925,206 B2 | 8/2005 | Akutagawa | 382/173 |
| 2002/0131620 A1 | 9/2002 | Shirato | 382/104 |
| 2003/0063773 A1 | 4/2003 | Muramatsu et al. | 382/104 |
| 2003/0103674 A1 | 6/2003 | Publicover | 382/215 |

(Continued)

FOREIGN PATENT DOCUMENTS

JP    05-164569 A    6/1993

(Continued)

OTHER PUBLICATIONS

Japanese Office Action dated Jun. 7, 2004.

*Primary Examiner*—Andrew W Johns
(74) *Attorney, Agent, or Firm*—Sughrue Mion, PLLC (57) ABSTRACT

A vehicle-onboard driving lane recognizing apparatus of a small scale includes an image pick-up unit (1) mounted on a motor vehicle for picking up images of scenes making appearance in front of the motor vehicle, an image data selecting unit (2) for selecting image data only of a predetermined region from the image picked up by the image pick-up unit (1), an image data storing unit (3) for storing the image data, and a driving lane recognizing unit (4) for detecting lane markings (21) on the road from the image data stored in the image data storing unit (3) to thereby recognize a driving lane extending along the lane markings (21). The image data selecting unit (2), the image data storing unit (3) and the driving lane recognizing unit (4) are all implemented in a single chip.

5 Claims, 9 Drawing Sheets

U.S. PATENT DOCUMENTS

2004/0062418 A1* 4/2004 Ishikura et al. ............ 382/104

FOREIGN PATENT DOCUMENTS

| JP | 09-223218 A | 8/1997 |
| JP | 11-213155 A | 8/1999 |
| JP | 2000-099896 A | 4/2000 |
| JP | 2001-022638 A | 1/2001 |

* cited by examiner

VEHICLE-ONBOARD DRIVING LANE RECOGNIZING APPARATUS

BACKGROUND OF THE INVENTION

This is a divisional of application Ser. No. 11/683,247 filed Mar. 7, 2007, now abandoned which is a divisional of application Ser. No. 10/379,531 filed Mar. 6, 2003 now abandoned.

FIELD OF THE INVENTION

The present invention relates to a driving lane recognizing apparatus mounted on a motor vehicle (hereinafter referred to as the vehicle-onboard driving lane recognizing apparatus) for detecting lane markings to recognize a driving lane.

DESCRIPTION OF RELATED ART

Heretofore, there have been proposed and developed a great variety of vehicle-onboard driving lane recognizing apparatuses which are designed for detecting lane markings or the like existing in front of a running motor vehicle to recognize a driving lane therefor.

In general, the conventional vehicle-onboard driving lane recognizing apparatus known heretofore is comprised of a CCD (Charge-Coupled Device) camera serving as an image pick-up means (also known as the imaging means) and a recognition processing unit serving as a recognizing means. The CCD camera is installed on, for example, a ceiling portion of the motor vehicle located in the vicinity of a driver seat for picking up image scenes such as landscapes or the like making appearance in front of the motor vehicle in the course of running.

In that case, the imaging range of the CCD camera is oriented or set such that a road extending for a predetermined distance before the motor vehicle can be covered by the landscape or scene picked up when the motor vehicle is running on the road.

On the other hand, the recognition processing unit is comprised of an analog-to-digital converter (ADC), a pre-processing ASIC (Application Specified IC), an image memory, a CPU (Central Processing Unit), a ROM (Read-Only memory), a communication IC (Integrated Circuit) and others.

The analog-to-digital converter serves for converting an analog image signal outputted from the CCD camera into digital image data. The pre-processing ASIC executes a predetermined pre-processing on the image data outputted from the analog-to-digital converter. As such pre-processing, there may be mentioned, by way of example, an edge emphasizing or enhancing filter processing. The image memory is destined for storing the image data resulting from the pre-processing. The CPU executes a processing for the stored image data to recognize the lane markings contained therein.

The RAM serves as a work area for the CPU, while the communication IC serves to transmit to a relevant external system or equipment the data such as, for example, the result of recognition of the lane markings transferred from the CPU. For more particulars, reference may have to be made to Japanese Patent Application Laid-Open Publication No. 213155/1999 (JP-A-11-213155).

In the conventional vehicle-onboard driving lane recognizing apparatus mentioned above, the analog-to-digital converter, the pre-processing ASIC, the image memory and the RAM are implemented individually as discrete chips, respectively, as a result of which the circuit scale of the vehicle-onboard driving lane recognizing apparatus becomes large and involves high cost in the implementation thereof, giving rise to a problem.

SUMMARY OF THE INVENTION

In the light of the state of the art described above, it is contemplated with the present invention as an object thereof to solve the problem mentioned above by providing an inexpensive vehicle-onboard driving lane recognizing apparatus of a small circuit scale.

In view of the above and other objects which will become apparent as the description proceeds, there is provided according to a general aspect of the present invention a vehicle-onboard driving lane recognizing apparatus which includes an image pick-up unit mounted on a motor vehicle running on a road for picking up images of scenes making appearance in front of the motor vehicle, an image data selecting unit for selecting image data only of a predetermined region from the image picked up by the image pick-up unit, an image data storing unit for storing the image data, and a driving lane recognizing unit for detecting lane markings on the road from the image data stored in the image data storing unit to thereby recognize a driving lane extending along the lane markings, wherein at least the image data selecting unit, the image data storing unit and the driving lane recognizing unit are all implemented in a single chip.

By virtue of the arrangement described above, there can be realized inexpensively the vehicle-onboard driving lane recognizing apparatus of a small circuit scale while making it unnecessary to install an external image data storing unit, to advantageous effect.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views.

Embodiment 1

Figure 1:
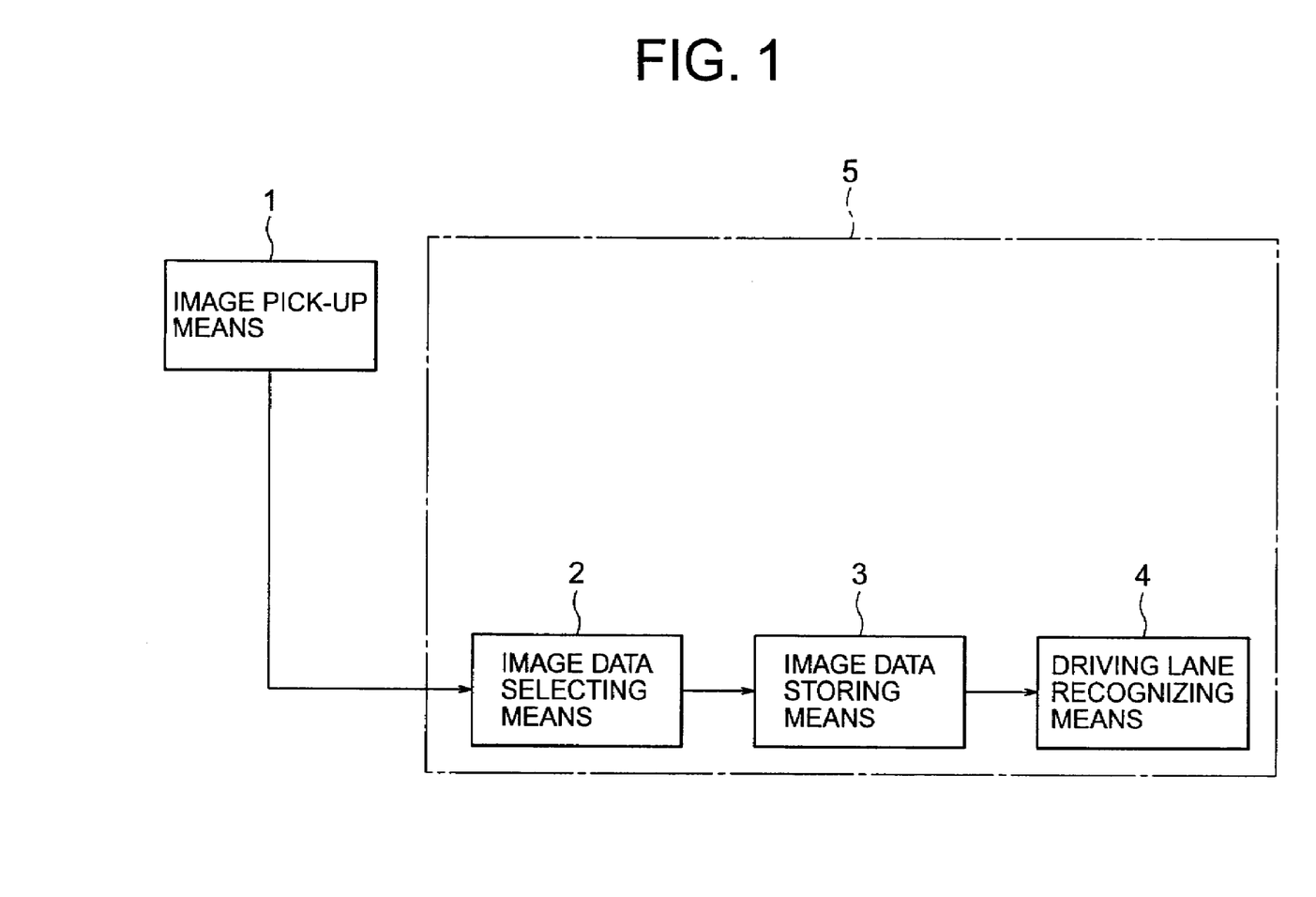
FIG. 1 is a block diagram showing generally and schematically an arrangement of a vehicle-onboard driving lane recognizing apparatus according to a first embodiment of the present invention.

Now, description will be made of the vehicle-onboard driving lane recognizing apparatus according to a first embodiment of the present invention. FIG. 1 is a block diagram showing an arrangement of the vehicle-onboard driving lane recognizing apparatus according to the first embodiment of the invention.

The vehicle-onboard driving lane recognizing apparatus is installed on a motor vehicle running on a road. Referring to FIG. 1, an image pick-up means (which may also be referred to as the imaging device or means) 1 is designed to pick up images of scenes making appearance in front of the motor vehicle, while an image data selecting means 2 is so designed as to select only the image data of specific zones or regions which are required for the recognition of a driving lane from those outputted from the image pick-up means 1.

An image data storing means 3 is designed to store therein the image data selected by the image data selecting means 2. A driving lane recognizing means 4 is designed to detect lane markings by making use of the image data stored in the image data storing means 3 for thereby recognizing the driving lane extending along the lane markings as detected.

At this juncture, it should be noted that the image data selecting means 2, the image data storing means 3 and the driving lane recognizing means 4 are realized en bloc in a single or unitary chip 5 as indicated by enclosing with a single-dotted broken line.

Incidentally, the image pick-up means 1 is shown as being provided externally of the chip 5. However, it goes without saying that the image pick-up means 1 may also be implemented on the chip 5 similarly to the other components or means mentioned above, if it is possible.

Next, description will be made in detail of the individual functional blocks.

At first, the image pick-up means 1 will be elucidated. The image pick-up means 1 is designed for taking picture or image of scenes making appearance in front of the motor vehicle in the course of running on a road. In general, two types of the image pick-up means are well known in the art. They are a CCD (Charge-Coupled Device) imaging device and a CMOS (Complementary Metal Oxide Semiconductor) imaging device. In this conjunction, it is presumed that the CMOS imaging device incorporating therein an analogue-to-digital converter (ADC) is employed as the image pick-up means in the vehicle-onboard driving lane recognizing apparatus according to the instant embodiment of the invention.

Incidentally, the image pick-up means 1 may be constituted by a CCD serving as the imaging device, a CCD driving IC (Integrated Circuit) and an analogue-to-digital converter (ADC).

Figure 2:
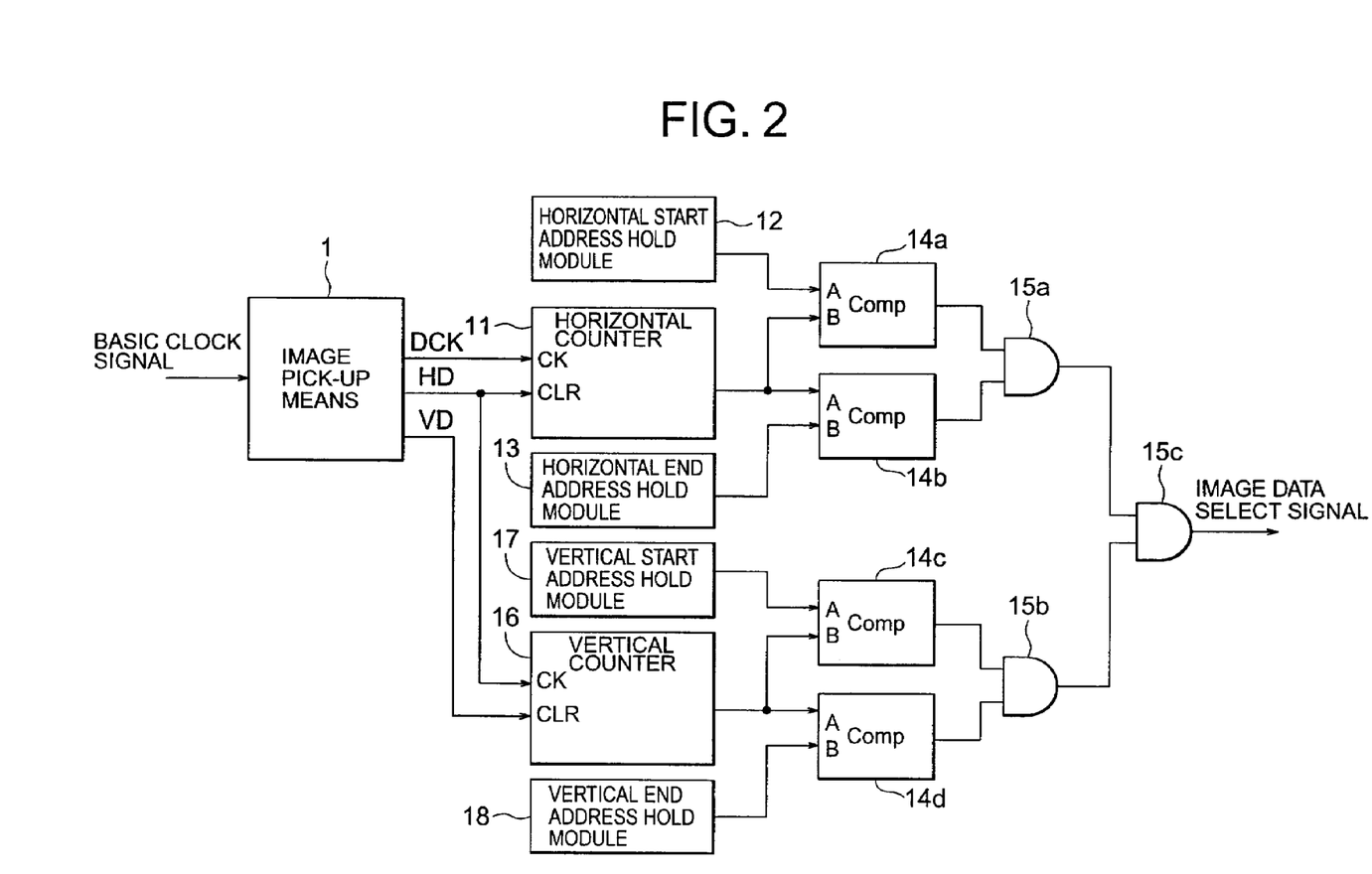
FIG. 2 is a block diagram showing a circuit arrangement of an image data selecting means according to the first embodiment of the present invention.

Next, description will be directed to the image data selecting means 2. FIG. 2 is a block diagram showing a circuit arrangement of the image data selecting means 2 according to the first embodiment of the present invention.

Since the circuit arrangement of the image data selecting means 2 is self-explanatory from FIG. 2, description will be directed to operation of the image data selecting means 2. A basic clock signal for driving the image pick-up means 1 is inputted to the image pick-up means 1. When various initial settings for the image pick-up means 1 have been completed, a dot clock signal DCK which changes by one cycle every time the data of one pixel is outputted from the image data taken by the image pick-up means 1, while a horizontal synchronizing signal HD and a vertical synchronizing signal VD are outputted upon every inputting of the basic clock signal.

A horizontal counter 11 designed for counting the number of pixels in the horizontal direction increments or counts up a count value upon every inputting of the dot clock signals DCK. The count value of the horizontal counter 11 is cleared once when the horizontal synchronizing signal HD is inputted.

The count value outputted from the horizontal counter 11 is compared by a comparator 14a with a horizontal start address (start address in the horizontal direction) preset at a horizontal start address hold module 12. When the count value becomes greater than the horizontal start address, the output of the comparator 14a changes from a level "L (low level)" to a level "H (high level)".

Further, the count value outputted from the horizontal counter 11 is compared by a comparator 14b with a horizontal end address (end address in the horizontal direction) placed in a horizontal end address hold module 13. So long as the count value remains smaller than the horizontal end address, the output of the comparator 14b assumes the level "H", whereas when the count value becomes greater than the horizontal end address, the output of the comparator 14b changes to the level "L" from "H".

A logical AND (logical product) circuit 15a determines a logical product of the outputs of the comparator 14a and the comparator 14b. The output signal of the logical AND circuit 15a serves as the select signal in the horizontal direction. Thus, in the horizontal direction, the pixel data located from the horizontal start address to the horizontal end address are selected from the image data picked up by the image pick-up means 1.

Similarly, in the vertical direction, a vertical counter 16 designed for counting the pixel number in the vertical direction increments the count value thereof in response to inputting of the horizontal synchronizing signal HD. The count value of the vertical counter 16 is once cleared when the vertical synchronizing signal VD is inputted.

The count value outputted from the vertical counter 16 is compared by a comparator 14c with a vertical start address (start address in the vertical direction) preset at a vertical start address hold module 17. When the count value becomes greater than the vertical start address, the output of the comparator 14c changes from a level "L" to a level "H" to be outputted.

Further, the count value outputted from the vertical counter 16 is compared by a comparator 14d with a vertical end address (end address in the vertical direction) placed in a vertical end address hold module 18. So long as the count value remains smaller than the vertical end address, the output of the comparator 14d assumes the level "H", whereas when the count value becomes greater than the vertical end address, the output of the comparator 14d changes to the level "L" from "H".

A logical AND circuit 15b determines a logical product of the outputs of the comparator 14c and the comparator 14d. The output signal of the logical AND circuit 15b serves as the select signal in the vertical direction. In other words, in the vertical direction, the pixel data located from the vertical start address to the vertical end address are selected from the image data picked up by the image pick-up means 1.

Finally, the output of the logical AND circuit 15a representing the select signal in the horizontal direction and the output of the logical AND circuit 15b representing the select signal in the vertical direction are logically ANDed by a logical AND circuit 15c, whereby the image data select signal for one rectangular select range is generated.

By making use of the generated select signal, the image data is selected to be subsequently stored in the image data storing means 3 of the succeeding stage.

Incidentally, the image data selecting means shown in FIG. 2 is so arranged as to select one rectangular region or zone. In this conjunction, it is to be added that in the case where a plurality of regions or zones are to be selected, a corresponding number of the image data selecting means each of the structure similar to that shown in FIG. 2 may be provided.

Further, although it has been described that the image data selecting means shown in FIG. 2 is realized by employing hardware such as the counters, comparators, etc., it goes without saying that the image data selecting means may be implemented by a microcomputer which is comprised of a CPU (Control Processing Unit), a RAM (Random Access Memory) and a timer at the least. In that case, the image selection may be realized by making use of the output signal waveform of the timer incorporated in the microcomputer.

In this conjunction, it should further be added that the image data selecting means 2, the image data storing means 3, and the driving lane recognizing means 4 may be realized by a microcomputer, as will be described hereinafter. In that case, it is preferred to realize the image selection by making use of the output signal of the timer, because then the circuit scale can be made small with the cost being reduced.

Besides, by selecting the image by means of software incorporated in the microcomputer, it is possible to change dynamically the select range of the image data in dependence on the recognized state of the driving lane.

Additionally, the whole image may be selected by designating the start address and the end address in both the horizontal and vertical directions, as the case may be.

Figure 3A:
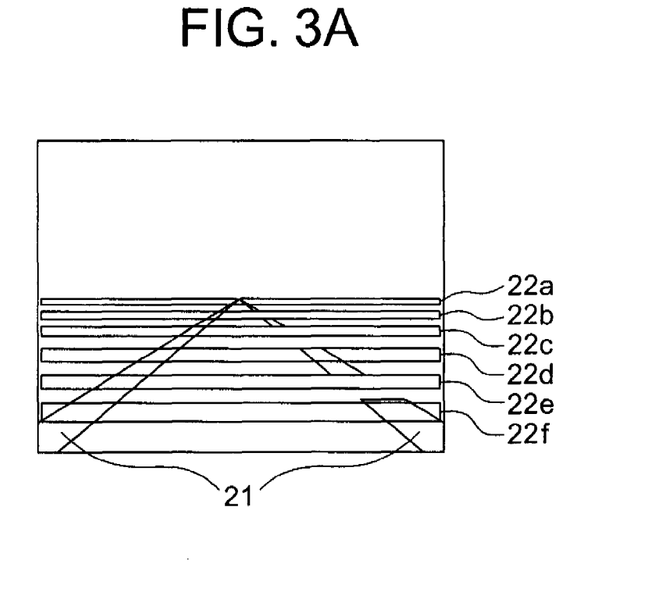
FIG. 3A is a view illustrating schematically image data selected by the image data selecting means according to the first embodiment of the present invention.
Figure 3B:
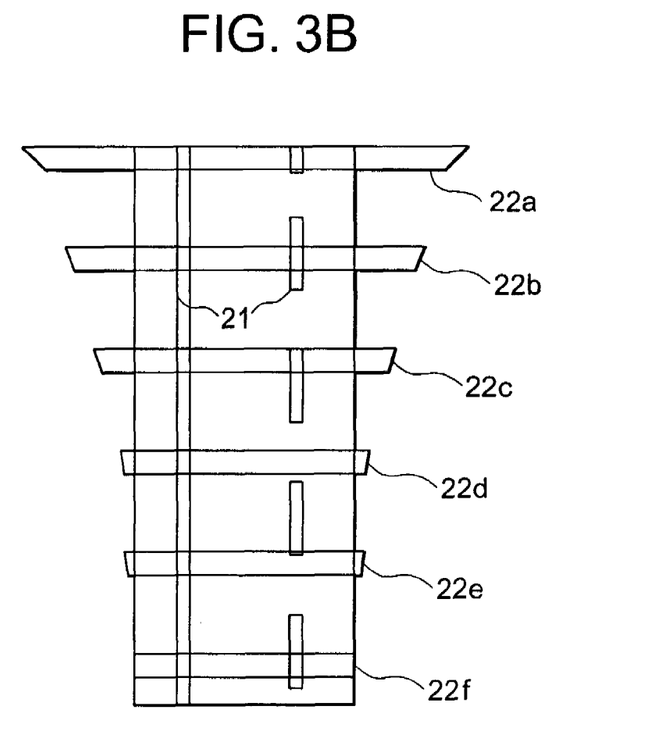
FIG. 3B is a view showing schematically an array of lane markings, as viewed from the top in FIG. 3A.

Next, referring to FIGS. 3A and 3B, description will be made as to what sort of the image data is selected by the image data selecting means 2 for the recognition of the driving lane. FIGS. 3A and 3B are views for illustrating the image data selected in the vehicle-onboard driving lane recognizing apparatus according to the first embodiment of the present invention.

According to a method adopted generally for recognizing the driving lane, search zones are set for detecting lane markings 21 painted on a road. In FIG. 3A, a plurality of search regions or zones 22a to 22f set for the recognition of the driving lane are exemplarily illustrated.

In this conjunction, it is noted that although a single search region or zone is defined by a rectangular region of (M×N) pixels with M pixels in the horizontal direction and N pixels in the vertical direction, where M and N represent given natural number, respectively, the search zone may be derived as a search line with the pixel number N in the vertical direction being one.

As shown in FIG. 3A, the search regions or zones are disposed on the road image lying beneath the horizon, starting from the top of the road image.

FIG. 3B is a top plan view of the image shown in FIG. 3A. As shown in FIG. 3B, it is preferred to dispose the search regions or zones orthogonally relative to the running or traveling direction of the motor vehicle substantially with equidistance among the search zones in the traveling direction for the reason described later on. As the search zones or regions for detecting the lane markings, there can be conceived other varieties. However, description thereof is omitted.

The image data of the individual search zones or regions selected by the image data selecting means 2 are stored in the image data storing means 3.

The driving lane recognizing means 4 detects the lane markings by processing the image data stored in the image data storing means 3 to thereby recognize a driving lane extending along the lane markings.

Next, description will be directed to the recognition of the driving lane as carried out by the driving lane recognizing means 4. As described previously, the position at which the lane marking exists in the selected search zone or region is detected. As the lane marking detecting method, there may be mentioned a conventional filter processings such as template matching or the like.

For effectuating the template matching, a template which exhibits a luminance distribution similar to that of the object to be detected is prepared, and the one exhibiting the highest correlation with the template is selected as the object concerned.

By way of example, presuming that the search zone shown in FIG. 3A are in the form of a search line, pulses of the luminance signal indicate the positions of the lane markings exhibiting high luminance. Further, by preparing a one-dimensional template for the lane marking and shifting the template bit by bit, for example, from the left, difference between the luminance signals is determined to thereby detect the location where the difference is greatest. Thus, it is decided that the location mentioned above exhibits the highest correlation with the template. In other words, it can be determined that the location mentioned above indicates the position of the lane marking.

On the basis of the positions of the lane markings detected in the individual search zones, respectively, the parameter representing the driving lane (road geometry) which can be represented by a polynomial or the like can be identified to be the result of recognition of the driving lane.

As described previously, by selectively setting the individual search zones such that they are disposed substantially with equidistance in the traveling direction, as viewed from the top, the detected positions of the lane markings will also lie with equidistance therealong. Thus, the parameter of the driving lane expressed by the polynomial or the like can be identified without any difficulty.

Next, description will be made of the single-dotted line block 5 shown in FIG. 1. The block 5 incorporating the image data selecting means 2, the image data storing means 3 and the driving lane recognizing means 4, as shown in FIG. 1, is realized as a single chip. In this conjunction, it is to be noted that the term "chip" used herein is used to mean primarily the chip dedicated to the image processing, i.e., image processing dedicated chip. It should however be understood that such chip can be realized by a microcomputer incorporating therein as the indispensable components a CPU, a RAM and a timer at the least. Accordingly, the term "chip" used herein is to be interpreted such that the microcomputer chip is covered as well.

In recent years, the capacity of the RAM incorporated integrally in the microcomputer tends to increase. However, the microcomputer incorporating the RAM of a large capacity capable of storing all the image data of, for example, 640×480 pixels, which is termed generally VGA (video graphics array) according to the video standards for PC, while allowing the program to run, is extremely expensive.

Such being the circumstances, according to the teachings of the present invention incarnated in the instant embodiment thereof, it is taught that the image data selecting means 2, the image data storing means 3 and the driving lane recognizing means 4 at the least are realized in one and the same chip, wherein only the image data of the specific region required for the recognition of the driving lane is selected by the image data selecting means 2 to be subsequently transferred to the image data storing means 3 (i.e., the so-called built-in RAM). By virtue of this arrangement, the built-in RAM can be of a small capacity and thus the chip can be realized significantly at very low cost. In other words, according to the teaching of the present invention incarnated in the instant embodiment, the vehicle-onboard driving lane recognizing apparatus of small circuit scale and low cost can be realized advantageously for practical applications.

At this juncture, it should also be added that so far as all the image data required for the recognition of the driving lane can be stored in the built-in RAM, there arises no necessity of providing an extraneous RAM externally of the chip to another advantage.

Furthermore, in the conventional vehicle-onboard image processing system, the image data is not intactly stored but a primitive processing called a so-called pre-processing such as typified by a simple filtering processing of the image data is performed by employing a dedicated IC such as an ASIC (application-specific integrated circuit) or the like. By contrast, in the case of the vehicle-onboard driving lane recognizing apparatus according to the instant embodiment of the invention, all the image data 1 are saved in the RAM incorporated in the chip 5 or the microcomputer chip. Accordingly, the pre-processing mentioned above can wholly be carried out softwarewise by taking advantage of high-seed access capability.

As is obvious from the above, extraneous external RAM and the dedicated IC such as application-specific integrated circuit can be spared, whereby the size or scale as well as the cost of the apparatus can remarkably be reduced.

Embodiment 2

In the vehicle-onboard driving lane recognizing apparatus according to the first embodiment of the present invention described above, no consideration has been paid to the transfer rate of the image data. According to the teaching of the invention incarnated in a second embodiment, there is adopted an arrangement for converting the transfer rate of the data derived from the output of the image pick-up means 1.

Figure 4:
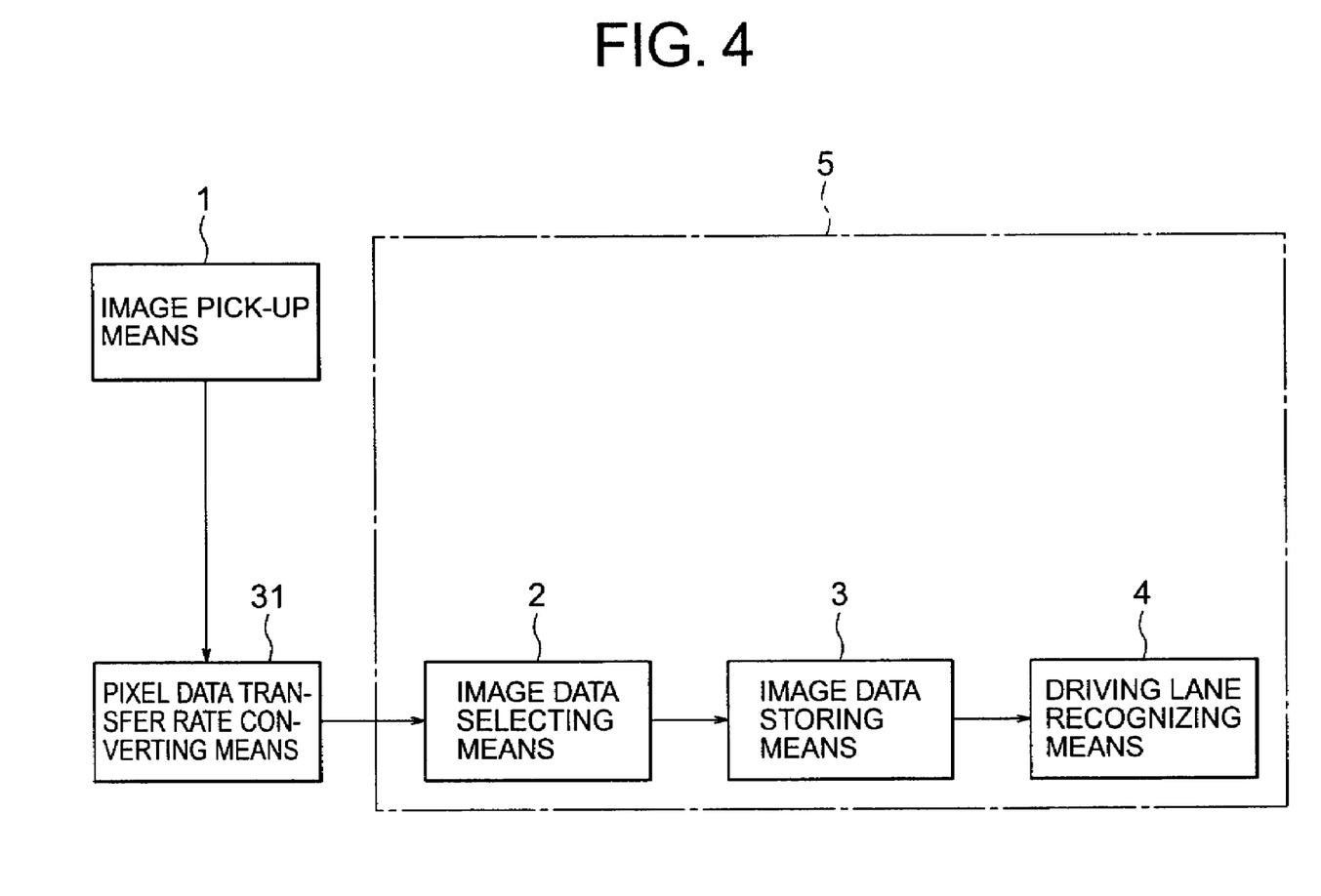
FIG. 4 is a block diagram showing an arrangement of the vehicle-onboard driving lane recognizing apparatus according to a second embodiment of the present invention.

FIG. 4 is a block diagram showing an arrangement or structure of the vehicle-onboard driving lane recognizing apparatus according to the second embodiment of the present invention. Incidentally, components same as or equivalent to those described hereinbefore by reference to FIG. 1 are denoted by like reference numerals and repeated description in detail thereof will be omitted.

Referring to FIG. 4, the vehicle-onboard driving lane recognizing apparatus according to the instant embodiment of the invention is provided with a pixel data transfer rate converting means 31 for converting the transfer rate of the pixel data of the image picked up by the image pick-up means 1.

At this juncture, it should be mentioned that the single-dotted broken line block 5 may be implemented as a single chip. In that case, only the image pick-up means 1 is provided externally of the chip 5. It goes however without saying that in case the image pick-up means 1 can be incorporated in the chip 5, it may be built in the chip similarly to the other means or components. Furthermore, although the block 5 may be constituted by a dedicated IC for the image processing, it is presumed that in the vehicle-onboard driving lane recognizing apparatus according to the instant embodiment of the invention, the block 5 is constituted by a microcomputer which includes as the indispensable components a CPU, a RAM and a timer at the least.

Description will now be directed to the operation of the pixel data transfer rate converting means 31. In the case where the output rate of the pixel data is lower than the transfer rate inherent to the microcomputer, it is possible to input the image data delivered from the image pick-up means intactly to the RAM incorporated in the microcomputer. On the other hand, when the output rate of the pixel data is higher than the transfer rate inherent to the microcomputer, the image data can be fetched by the microcomputer by lowering the transfer rate of the pixel data by adopting the arrangement shown in FIG. 5, as will be described below.

More specifically, by making use of a dot clock signal which changes by one cycle every time the pixel data of one pixel (picture element) is outputted from the image pick-up means, the pixel data can be transferred to the built-in RAM of the microcomputer at the transfer rate corresponding to 1/M of the output rate of one pixel data, where M represents a given natural number.

Figure 5:
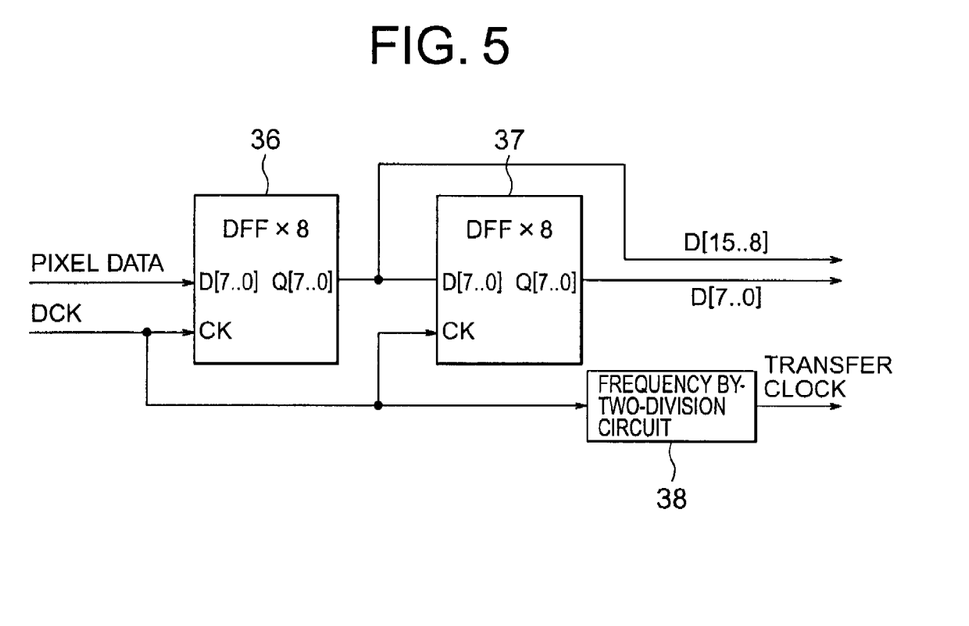
FIG. 5 is a circuit block diagram showing concretely a circuit configuration of an image data transfer rate converting means according to the second embodiment of the present invention.

FIG. 5 is a circuit block diagram showing concretely a circuit configuration of the pixel data transfer rate converting means 31. Referring to FIG. 5, operation of the pixel data transfer rate converting means 31 will be described below on the presumption that M is equal to "2".

The pixel data outputted sequentially from the image pick-up means 1 are supplied to input ports D[7 . . . 0] of D-flip-flops (DFFs) 36 and 37 to be stored in the D-flip-flops 36 and 37 under the timing of the dot clock signal DCK which changes by one cycle every time one pixel of the pixel data is outputted.

In this conjunction, it is to be noted that the pixel data outputted from the output port Q[7 . . . 0] of the D-flip-flop 37 temporally proceeds by one pixel relative to the pixel data outputted from the output port Q[7 . . . 0] of the D-flip-flop 36.

Figure 6:
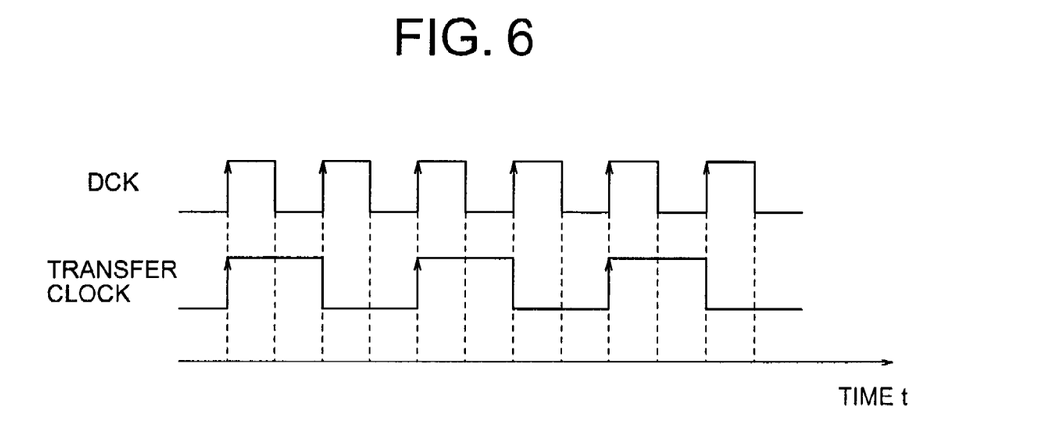
FIG. 6 is a view for graphically illustrating relation between a dot clock signal DCK and a transfer clock signal derived by dividing the frequency of the dot clock signal by two in the vehicle-onboard driving lane recognizing apparatus according to the second embodiment of the present invention.

On the other hand, the frequency of the dot clock signal DCK is lowered to a half by means of a frequency by-two-division circuit which may be realized by a T-flip-flop (TFF) 38. Relation between the original dot clock signal DCK and the transfer clock whose frequency is equal to a quotient resulting from division of the dot clock DCK by two is such as illustrated in FIG. 6.

When pixel data of two pixels have been inputted with two dot clocks DCK, the pixel data of two pixels are transferred to the microcomputer.

In this manner, two pixel data each of 8 bits which temporally continue to each other are made available from the outputs of the D-flip-flops 36 and 37 to be transferred to the built-in RAM of the microcomputer from the 16-bit transfer port under the timing of the transfer clock signal.

As is apparent from the foregoing, with the circuit arrangement described above, it is possible to fetch the image data on a real-time basis even when the transfer rate at which the pixel data is transferred to the built-in RAM of the microcomputer is lower than the output rate of the pixel data outputted from the image pick-up means 1 by latching a predetermined number of pixel data and by transferring en bloc the pixel data when the predetermined number of the pixel data have been latched.

In this manner, by realizing the pixel data transfer rate converting means 31 for converting the transfer rate of the image data with a simplified structure, the select range of the microcomputer can be broadened, which in turn means that the microcomputer of low cost and low transfer rate can be employed while mitigating limitation imposed on the built-in RAM capacity of the microcomputer similarly to the case of the first embodiment of the invention, whereby the total cost demanded for the vehicle-onboard driving lane recognizing apparatus can be reduced.

Embodiment 3

In the case of the vehicle-onboard driving lane recognizing apparatus first and second embodiments of the present invention, the image data outputted from the image pick-up means 1 are fetched for use. According to the teaching of the present invention incarnated in a third embodiment thereof, image data available from an external system or equipment can also be made use of.

Figure 7:
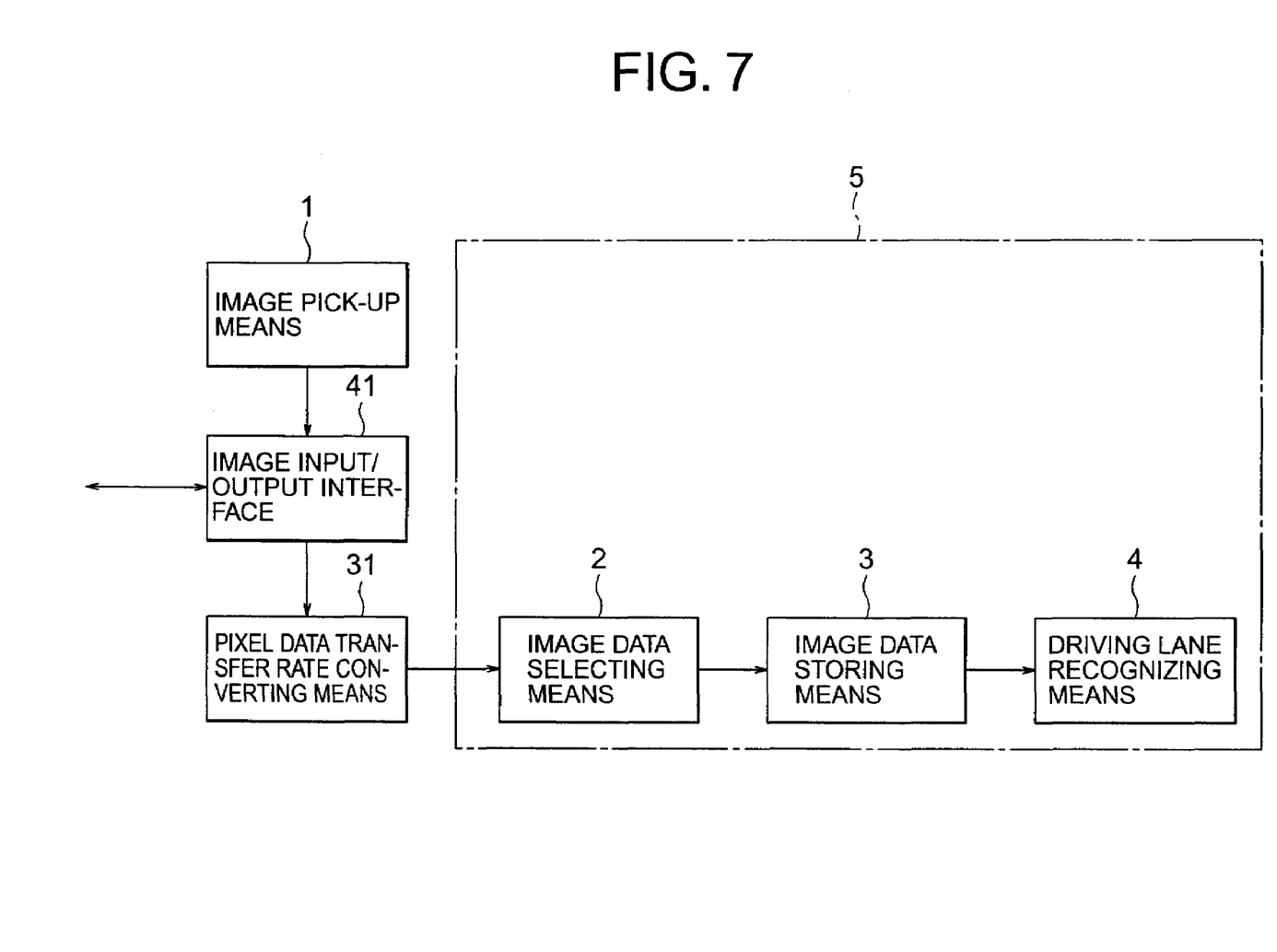
FIG. 7 is a block diagram showing an arrangement of the vehicle-onboard driving lane recognizing apparatus according to a third embodiment of the present invention.

FIG. 7 is a block diagram showing an arrangement or structure of the vehicle-onboard driving lane recognizing apparatus according to the third embodiment of the present invention. Incidentally, in FIG. 7, components same as or equivalent to those described hereinbefore by reference to FIGS. 1 and 4 are denoted by like reference numerals and repeated description in detail thereof will be omitted.

Referring to FIG. 7, in the vehicle-onboard driving lane recognizing apparatus according to the instant embodiment of the invention, all the image data derived from the output of the image pick-up means 1 are also outputted to an external system or equipment. The vehicle-onboard driving lane recognizing apparatus now under consideration is provided with an image input/output interface 41 which is so designed as to transfer the image data inputted from the external system or equipment to the image data storing means 3 by way of the image data selecting means 2 in place of the image data outputted from the image pick-up means 1, when the image data is supplied from the external system or equipment.

Figure 8:
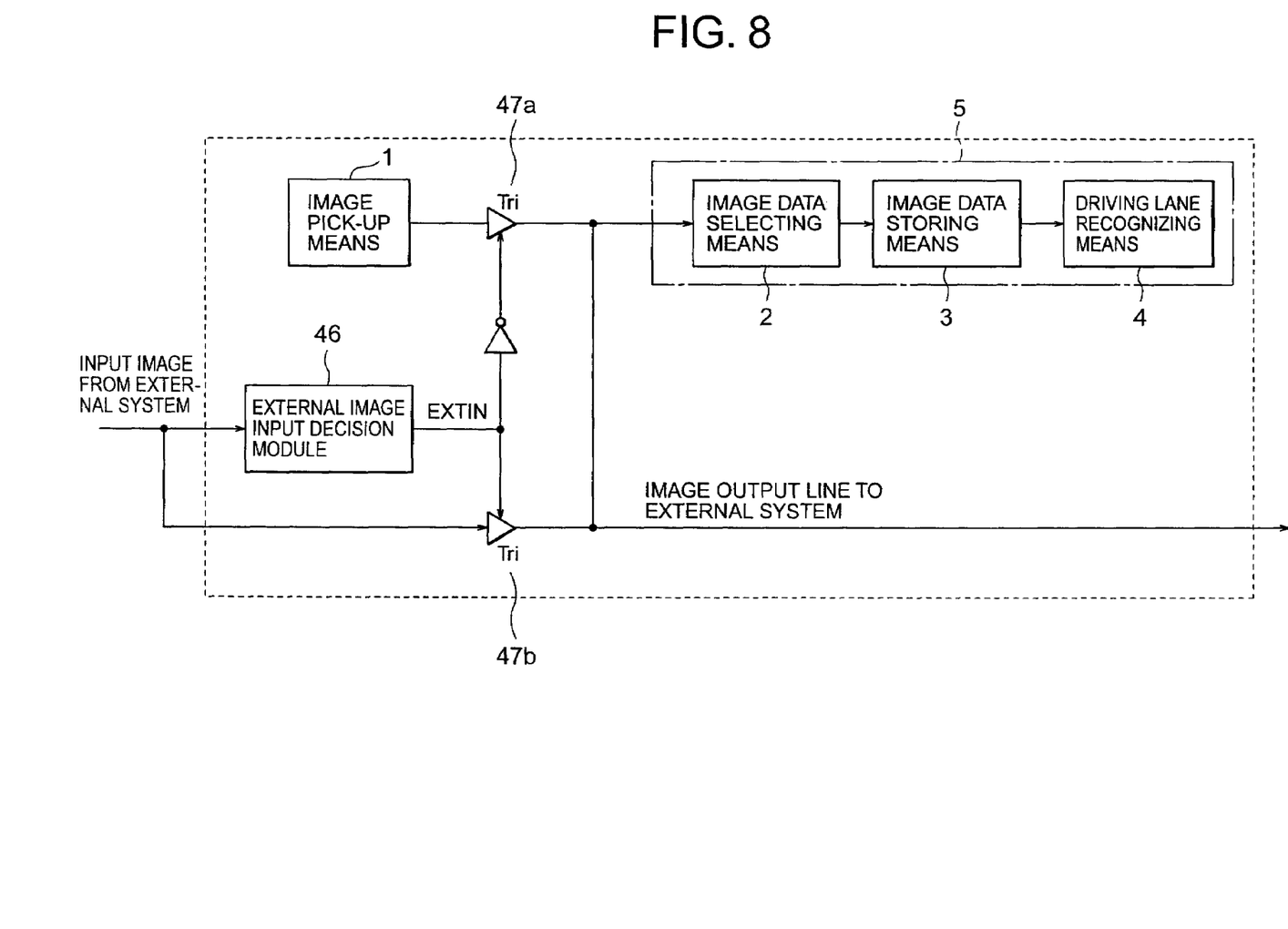
FIG. 8 is a block diagram showing an arrangement of an image input/output interface of the vehicle-onboard driving lane recognizing apparatus according to the third embodiment of the present invention.

FIG. 8 is a block diagram showing an arrangement or structure of the image input/output interface 41 of the vehicle-onboard driving lane recognizing apparatus according to the third embodiment of the present invention. Incidentally, components same as or equivalent to those described hereinbefore by reference to FIGS. 1, 4 and 7 are denoted by like reference numerals and repeated description in detail thereof will be omitted.

At this juncture, it should also be mentioned that the single-dotted broken line block 5 may be implemented as in the form of a single chip. In that case, only the image pick-up means 1 is provided externally of the chip 5. It goes however without saying that in case the image pick-up means 1 can be incorporated in the chip 5, it may be built in the chip similarly to the other means or constituents.

Now referring to FIG. 8, an external image input decision module 46 is designed to make decision as to whether or not the image data is inputted from the external system and output a decision signal EXTIN of level "H" when it is determined that the image data is inputted externally. On the other hand, when it is determined that no external image data input exists, the external image input decision module 46 outputs the decision signal EXTIN of level "L".

The decision signal EXTIN is used as a gate signal for three-state buffers 47a and 47b, respectively. Unless the image data is inputted from the external system, the image data derived from the output of the image pick-up means 1 is delivered intactly from the output of the three-state buffer 47a since the decision signal EXTIN is of "L" level, while the output of the three-state buffer 47b exhibits a high impedance.

Consequently, in the above-mentioned case, the image data outputted from the image pick-up means 1 are transferred to the image data storing means 3 by way of the image data selecting means 2 and at the same time the image data outputted from the image pick-up means 1 are supplied to the external system through image output line.

On the other hand, in the case where the image data are inputted from the external system, the decision signal EXTIN will then assume the level "H". In that case, the output of the three-state buffer 47a exhibits high impedance, whereby the externally inputted image data delivered from the output of the three-state buffer 47b are transferred to the image data storing means 3 via the image data selecting means 2. Further, the externally inputted image data is supplied to the external system through the image output line as well.

By virtue of the arrangement of the vehicle-onboard driving lane recognizing apparatus described above, even through only the image data of a given limited region or zone can be stored internally of the apparatus, the whole image can also be observed or confirmed because all the image data are outputted externally.

Furthermore, in the case where the image data is available from the external system or equipment, the image data can be transferred to the image data storing means 3 incorporated in the apparatus. Then, the image data taken upon running or driving test or for the other purpose may be inputted from a relevant external system or equipment to thereby logically examine the driving lane recognition processing on a desk.

At this juncture, it should be mentioned that substantially only the three-state buffers 47a and 47b are additionally incorporated in the apparatus for realizing the function described above. In other words, the functions for checking or observing the whole image as well as for the logical examination on the desk can be added without increasing appreciably the control signal of the whole apparatus.

Embodiment 4

In the description of the first to third embodiments of the invention, no consideration has been paid to the basic clock signal supply. The vehicle-onboard driving lane recognizing apparatus according to a fourth embodiment of the present invention is so arranged that the individual means thereof are driven on the basis of a basic clock signal supplied from a single oscillator.

Figure 9:
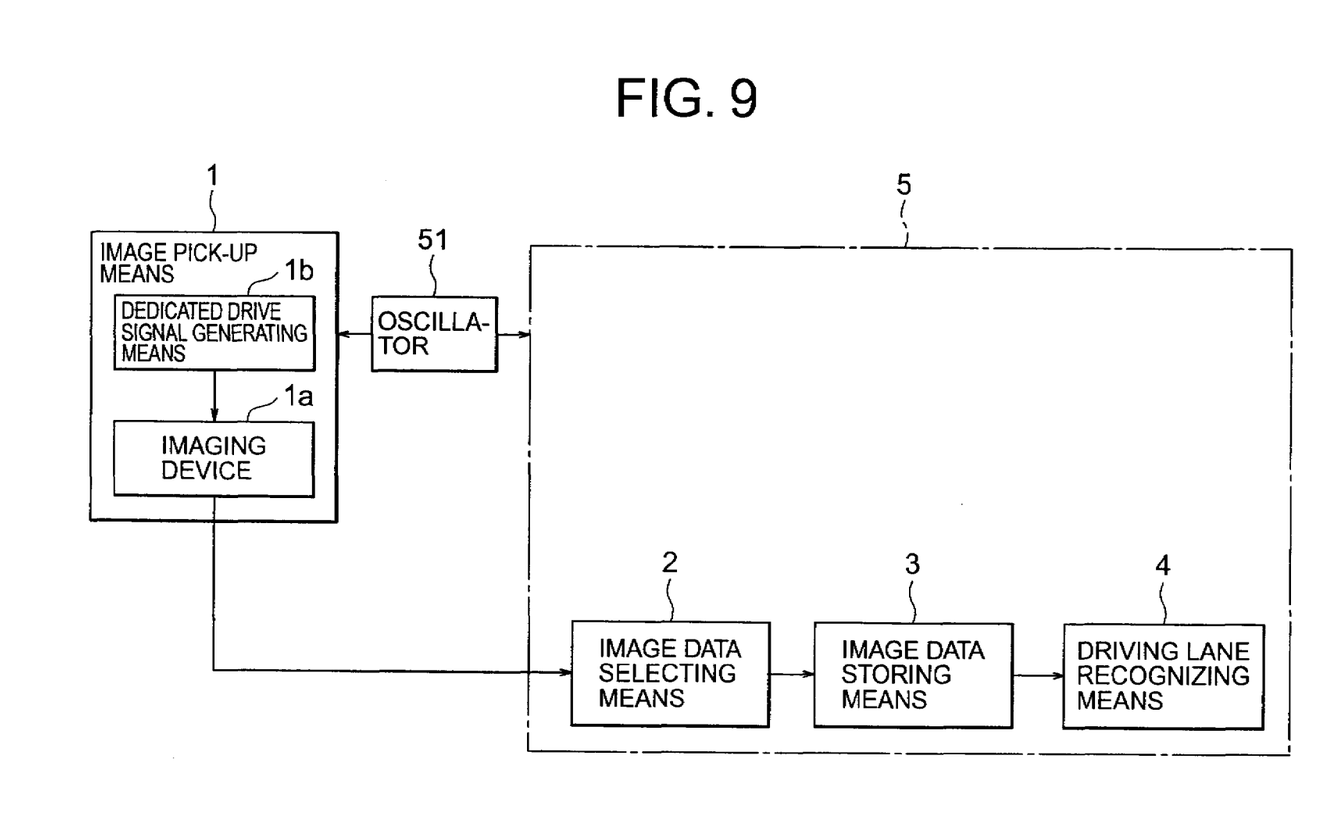
FIG. 9 is a block diagram showing an arrangement of the vehicle-onboard driving lane recognizing apparatus according to a fourth embodiment of the present invention.

Referring to FIG. 9, the vehicle-onboard driving lane recognizing apparatus is provided with an oscillator 51 for supplying the basic clock signal to the image pick-up means 1 and the block 5, wherein the image pick-up means 1 is comprised of an image-pickup device 1a and a dedicated driving signal generating means 1b which is dedicated for driving the image-pickup device 1a.

In operation, the basic clock signal supplied to the image pick-up means 1 from the oscillator 51 is inputted to the dedicated driving signal generating means 1b incorporated in the image pick-up means 1.

The dedicated driving signal generating means 1b is designed to generate various driving signals such as the horizontal synchronizing signal HD and the vertical synchronizing signal VD for driving the image-pickup device 1a and others.

The generated driving signals are inputted to the image-pickup device 1a for driving the same. The image-pickup device 1a outputs the image data which are then stored in the image data storing means 3 by way of the image data selecting means 2.

The driving lane recognizing means 4 executes the processing for recognizing the driving lane by making use of the image data stored in the image data storing means 3. Parenthetically, operation of the driving lane recognizing means 4 is similar to that described hereinbefore in conjunction with the preceding embodiments of the invention. Accordingly, repeated description will be unnecessary.

At this juncture, it is to be noted that the basic clock signal for driving the image pick-up means 1 is in common to the clock for driving the image data selecting means 2, the image data storing means 3 and the driving lane recognizing means 4.

In the case of the conventional vehicle-onboard driving lane recognizing apparatus, the basic clock signal for driving the image pick-up means 1 is prepared separately from the clock signal for driving the other units than the image pick-up means 1 in view of the video signal standards. By contrast, in the vehicle-onboard driving lane recognizing apparatus according to the instant embodiment of the invention, the basic clock signal is commonly used for driving not only the image pick-up means 1 and the other portions (e.g. block 5). In other words, employment of the single oscillator is sufficient. Owing to this feature, the timing circuit design can be simplified and facilitated.

Figure 10:
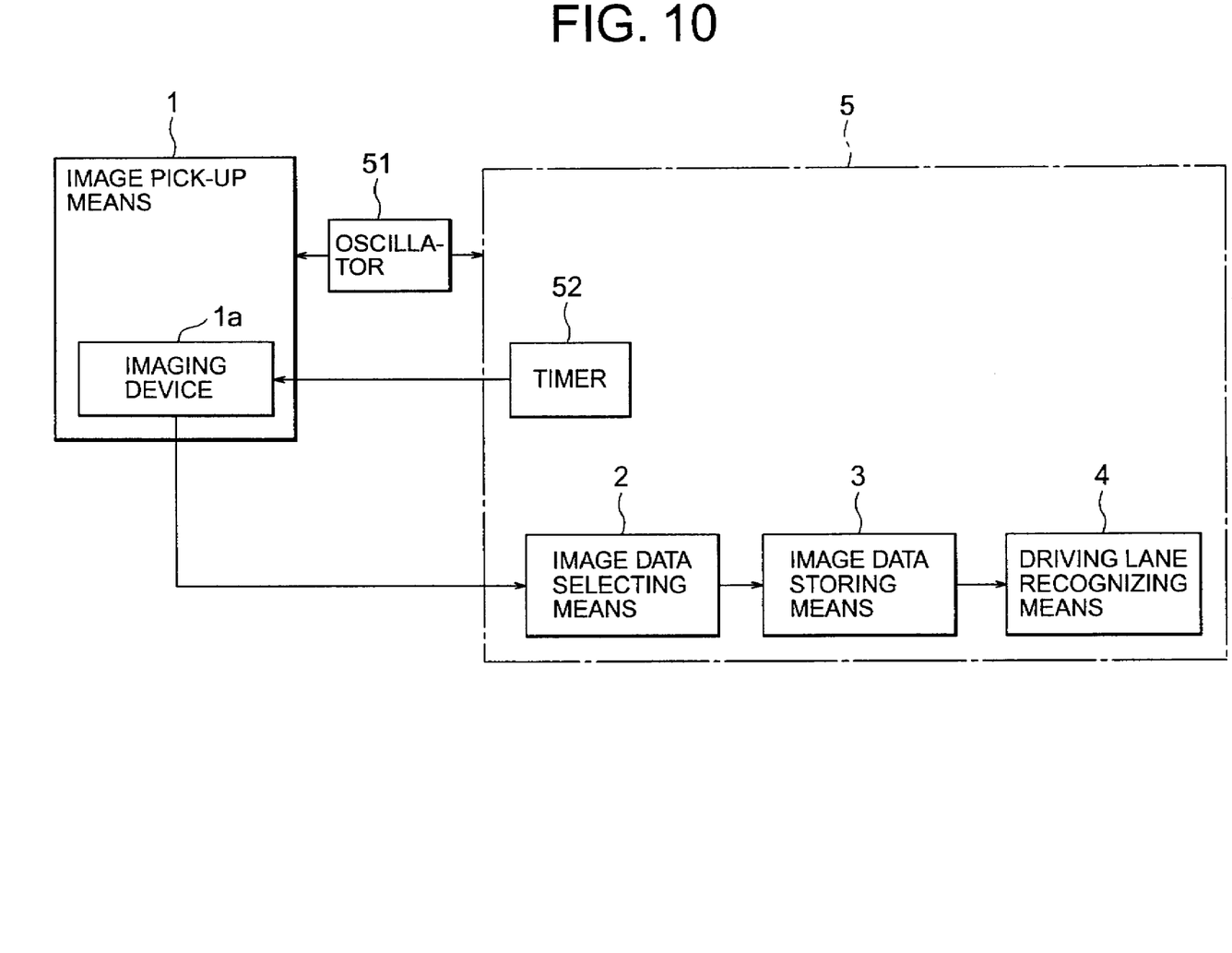
FIG. 10 is a block diagram showing an arrangement of the vehicle-onboard driving lane recognizing apparatus according to a version of the fourth embodiment of the present invention.

Further, for driving the image pick-up means 1 together with the other units with the common basic clock signal, such arrangement as shown in FIG. 10 can also be adopted.

FIG. 10 is a block diagram showing an arrangement or structure of the vehicle-onboard driving lane recognizing apparatus according to the fourth embodiment of the present invention. Incidentally, in FIG. 10, components same as or equivalent to those described hereinbefore by reference to FIGS. 1, 4, 7 and 9 are denoted by like reference numerals and repeated description in detail thereof will be omitted.

In the vehicle-onboard driving lane recognizing apparatus shown in FIG. 10, the block 5 is realized as a microcomputer which includes a CPU, a RAM and a timer at the least as the indispensable components. This microcomputer operates under the timing of the basic clock signal supplied from the oscillator 51.

In the vehicle-onboard driving lane recognizing apparatus shown in FIG. 9, the driving signal for driving the image-pickup device 1a is generated by the dedicated driving signal generating means 1b. On the other hand, in the case of the vehicle-onboard driving lane recognizing apparatus shown in FIG. 10, the driving signal mentioned above is generated by the timer incorporated in the microcomputer. Accordingly, the dedicated driving signal generating means 1b which is required for driving the image-pickup device 1a in the vehicle-onboard driving lane recognizing apparatus shown in FIG. 9 can be spared in the vehicle-onboard driving lane recognizing apparatus shown in FIG. 10. Thus, the vehicle-onboard driving lane recognizing apparatus shown in FIG. 10 can be realized on a much smaller scale basis when compared with that shown in FIG. 9.

As can be understood from the above, by driving the image pick-up means 1 and the other components with a common clock signal, it is sufficient to employ only one oscillator 51, which means that the vehicle-onboard driving lane recognizing apparatus can be manufactured at low cost. Besides, because the components or means incorporated in the vehicle-onboard driving lane recognizing apparatus are driven by the common clock signal, the arrangement for timing properly the operation of these means can easily be designed and implemented.

Further, by generating the driving signal for driving the image-pickup device 1a by means of the built-in timer 52 incorporated in the microcomputer as in the case of the vehicle-onboard driving lane recognizing apparatus shown in FIG. 10, the circuit scale can further be reduced.

It should however be mentioned that although the image pick-up means 1 and the other components or means are operated under the timing of the one and the same clock signal in the vehicle-onboard driving lane recognizing apparatus according to the instant embodiment of the invention, such arrangement may of course be adopted that the basic clock signal for driving the image pick-up means 1 is N times as high as the clock signal for operating the other means or components or alternatively the frequency of the basic clock signal for driving the image pick-up means 1 may be 1/N of that of the clock signal for driving the other means or components, where N represents a given natural number.

The block 5 indicated as enclosed by the single-dotted broken line may be realized in one chip. In that case, only the image pick-up means 1 is provided externally of the single-dotted line block 5. It should however be appreciated that the image pick-up means 1 may be incorporated in the chip 5 together with the other means or components if it is possible.

In general, the exposure control based on the luminance information of the whole image will incur essentially no problem. However, in the case of the vehicle-onboard image processing apparatus, it is preferred to prevent the luminance information of the unnecessary image region from being reflected in the exposure control. In other words, the exposure control should ideally be performed by making use of the luminance information of a concerned or relevant portion of the image. In that case, a luminance measuring timing signal is required for measuring luminance of the concerned portion of the image in synchronism with the operation timing of the image pick-up means 1. In this conjunction, it should be noted that because the same basic clock signal is employed commonly for all the components of the vehicle-onboard driving lane recognizing apparatus realized in the arrangement shown in FIG. 10, the luminance measuring timing signal can equally be derived from the output of the timer incorporated in the microcomputer.

Many modifications and variations of the present invention are possible in the light of the above techniques. It is therefore to be understood that within the scope of the appended claims, the invention may be practiced otherwise than as specifically described.

What is claimed is:

1. A vehicle-onboard driving lane recognizing apparatus, comprising:

image pick-up means mounted on a motor vehicle running on a road for picking up images of scenes making appearance in front of said motor vehicle;

image input/output interface means for selecting one of input from said image pick-up means and input from an external system for outputting the selected image data;

image data selecting means for selecting image data of only a predetermined region from said image data;

image data storing means for storing the image data selected by said image data selecting means; and driving lane recognizing means for detecting lane markings on said road from the image data stored in said image data storing means to thereby recognize a driving lane extending along said lane markings, wherein said image input/output interface means is so arranged that when it is decided that the image data originating in said external system is inputted, said image input/output interface means selects said external system as an input source to thereby allow said image data supplied from said input source to be outputted to said image data selecting means and said external system, whereas when it is decided that the image data is not inputted from said external system, said image input/output interface means selects said image pick-up means as the input source to thereby output the image data supplied from said image pick-up means to said image data selecting means and said external system.

2. A vehicle-onboard driving lane recognizing apparatus according to claim 1, said image data selecting means, said image data storing means and said driving lane recognizing means being realized by a microcomputer which incorporates therein software for selecting the image data of said predetermined region and a timer, wherein said image data selecting means is so designed as to select the image data in dependence on high level and low level of an output signal of said timer while changing dynamically selection-subjected objects contained in said image data.

3. A vehicle-onboard driving lane recognizing apparatus according to claim 1, further comprising:

an oscillator designed to output a basic clock signal for controlling said image data selecting means, said image data storing means and said driving lane recognizing means, wherein a control signal for controlling said image pick-up means is generated on the basis of said basic clock signal.

4. A vehicle-onboard driving lane recognizing apparatus according to claim 1, said image data selecting means, said image data storing means and said driving lane recognizing means being realized by a microcomputer which incorporates therein a timer, wherein an output signal of said timer is made use of as a control signal for controlling said image pick-up means.

5. A vehicle-onboard driving lane recognizing apparatus according to claim 1, wherein said image data selecting means is so arranged as to select a plurality of predetermined regions on a road which corresponds to an image located beneath the horizon from an image picked up by said image pick-up means, said plurality of predetermined regions extending orthogonally to a traveling direction of said motor vehicle substantially with equidistance among said predetermined regions as viewed in the traveling direction of said motor vehicle.

* * * * *